July 23, 1940.　　　R. H. LAWSON ET AL　　　2,209,061
METHOD AND MACHINE FOR KNITTING
Filed Oct. 1, 1936　　　14 Sheets-Sheet 1

INVENTORS:
ROBERT H. LAWSON,
AUGUSTIN GAGNÉ,
BY Roy F. Lovell,
ATT'Y.

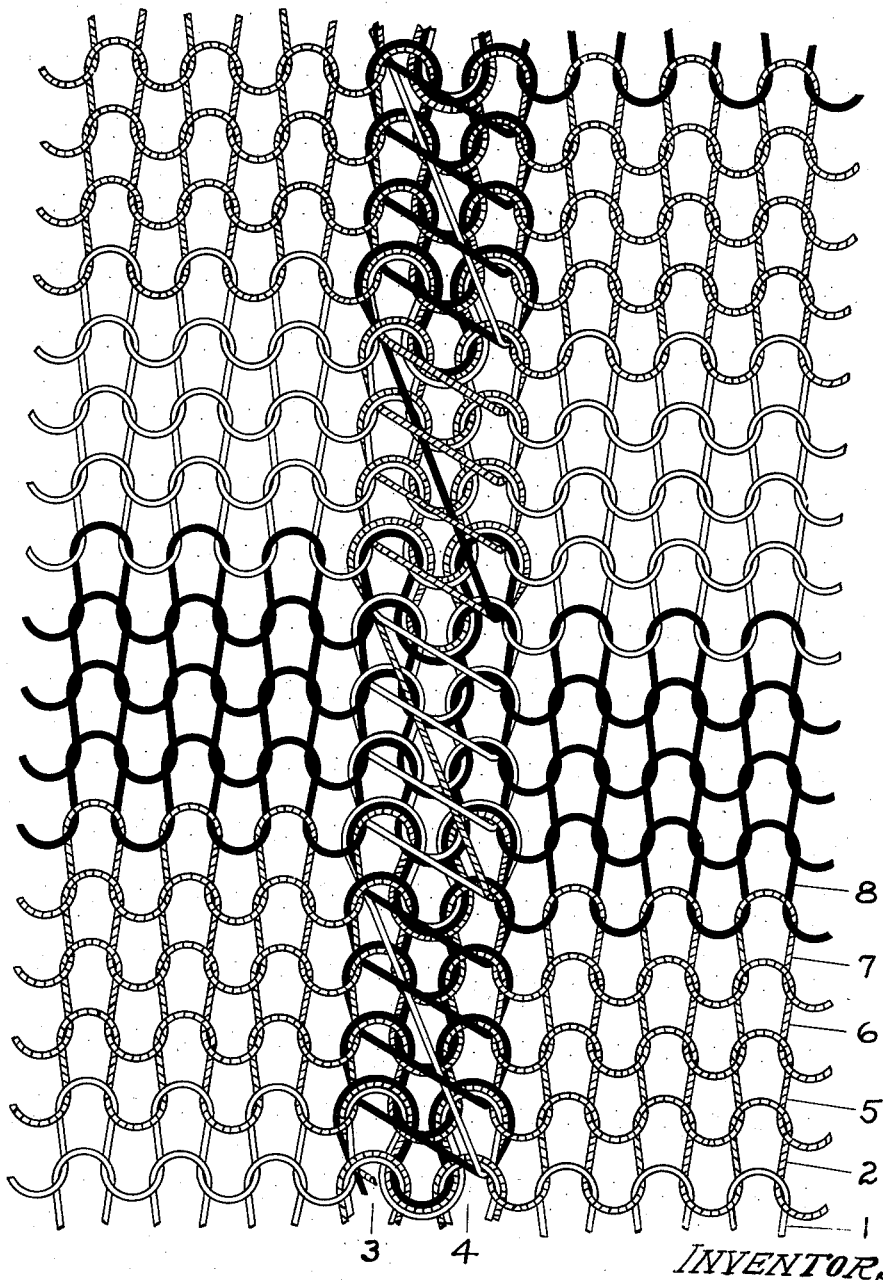

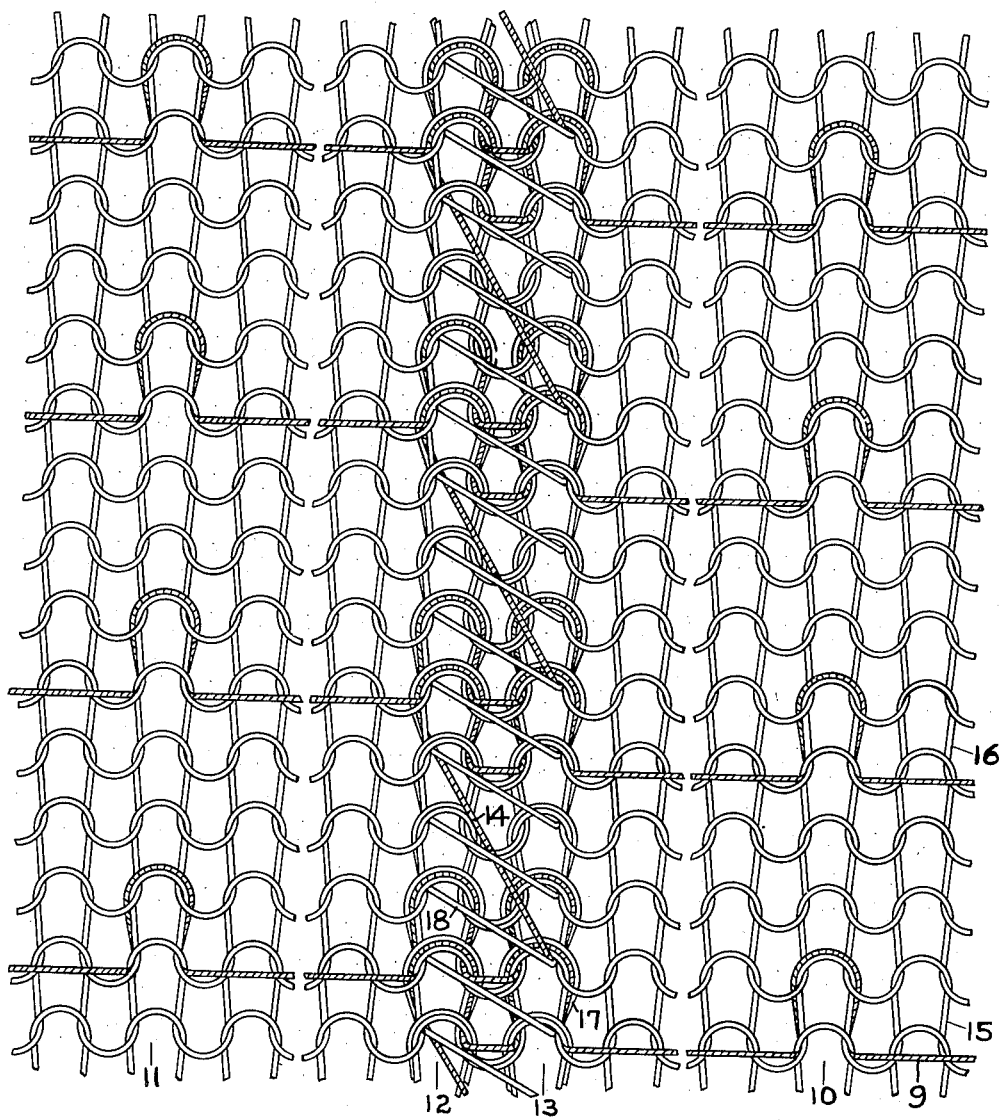

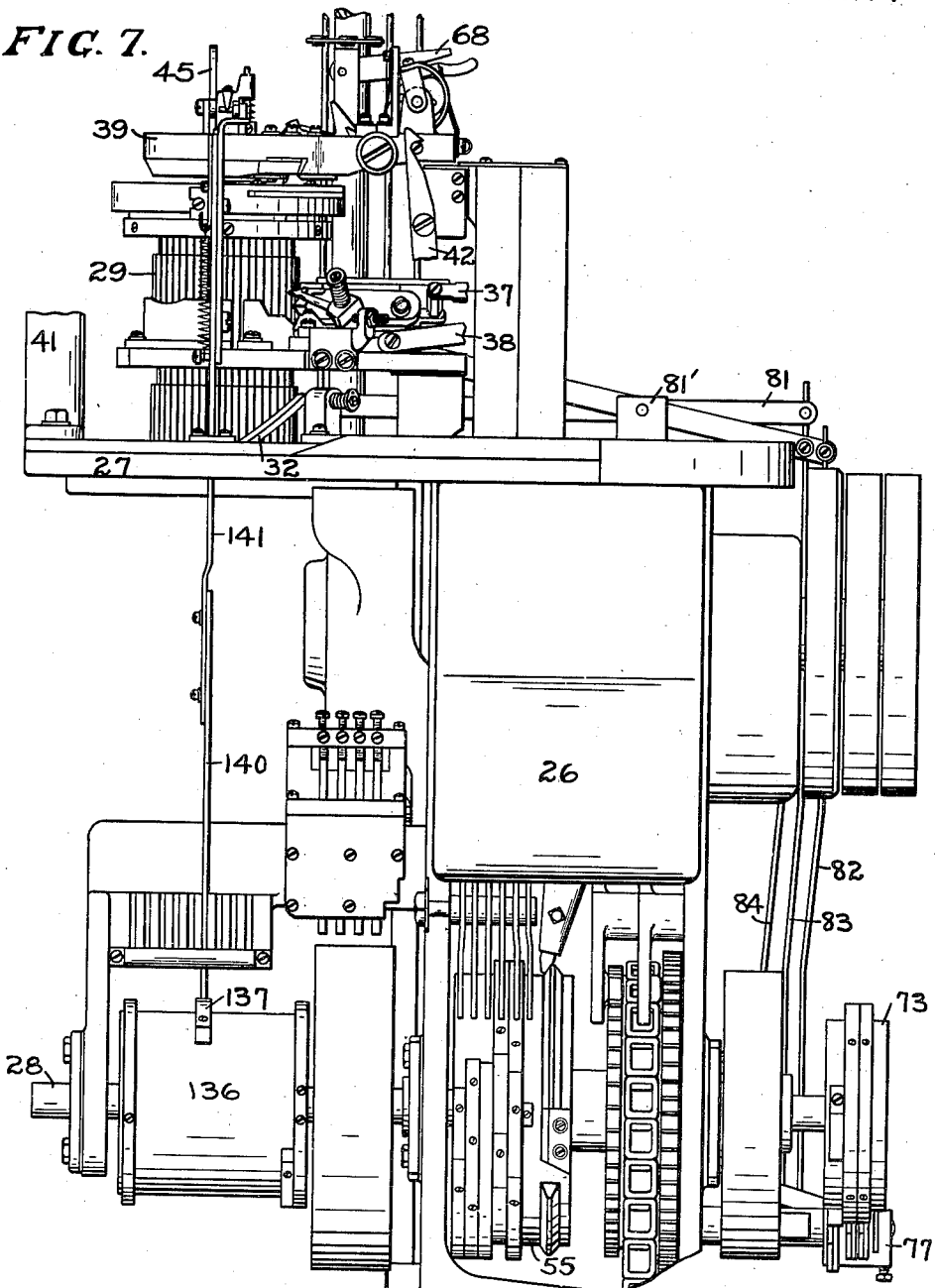

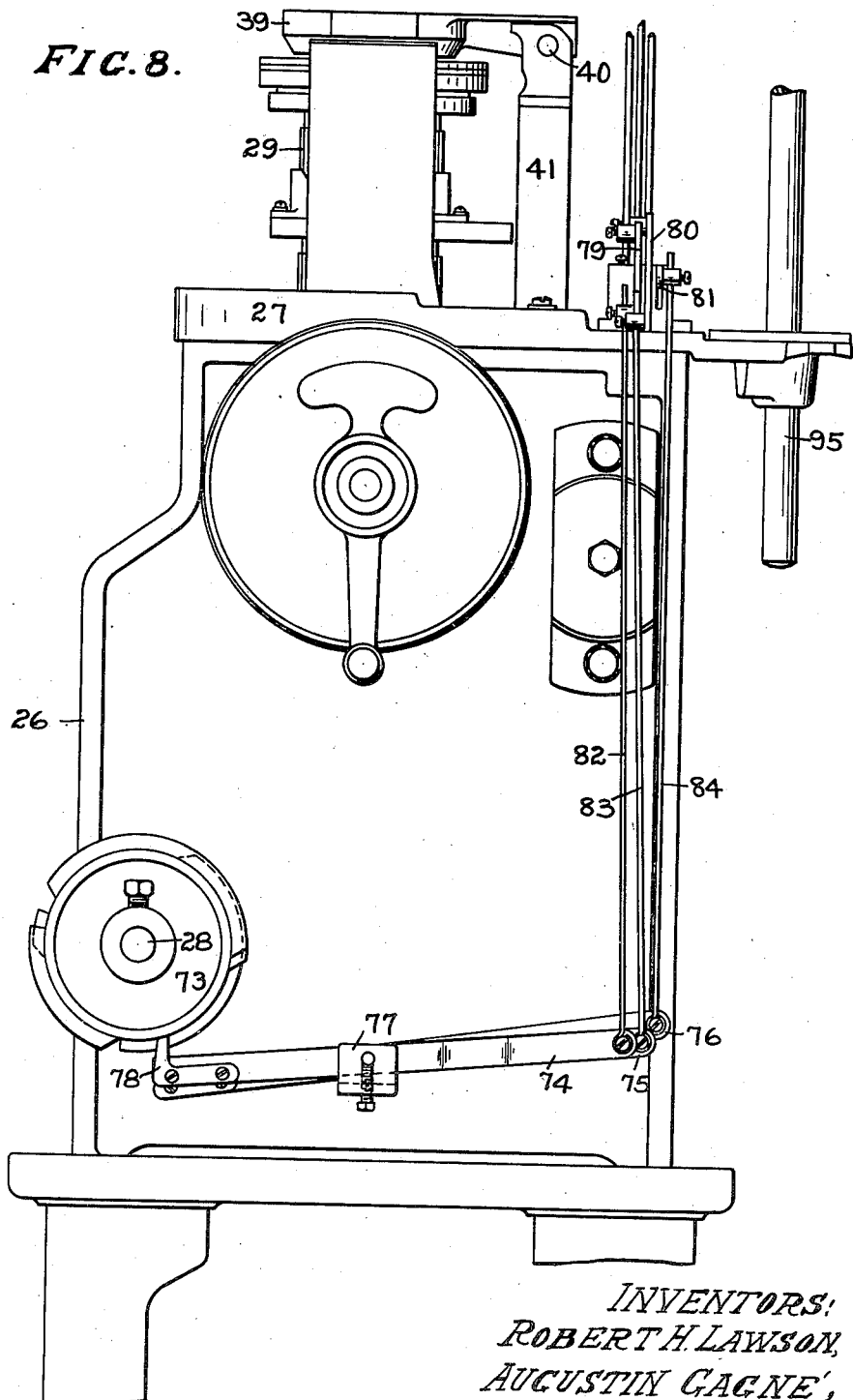

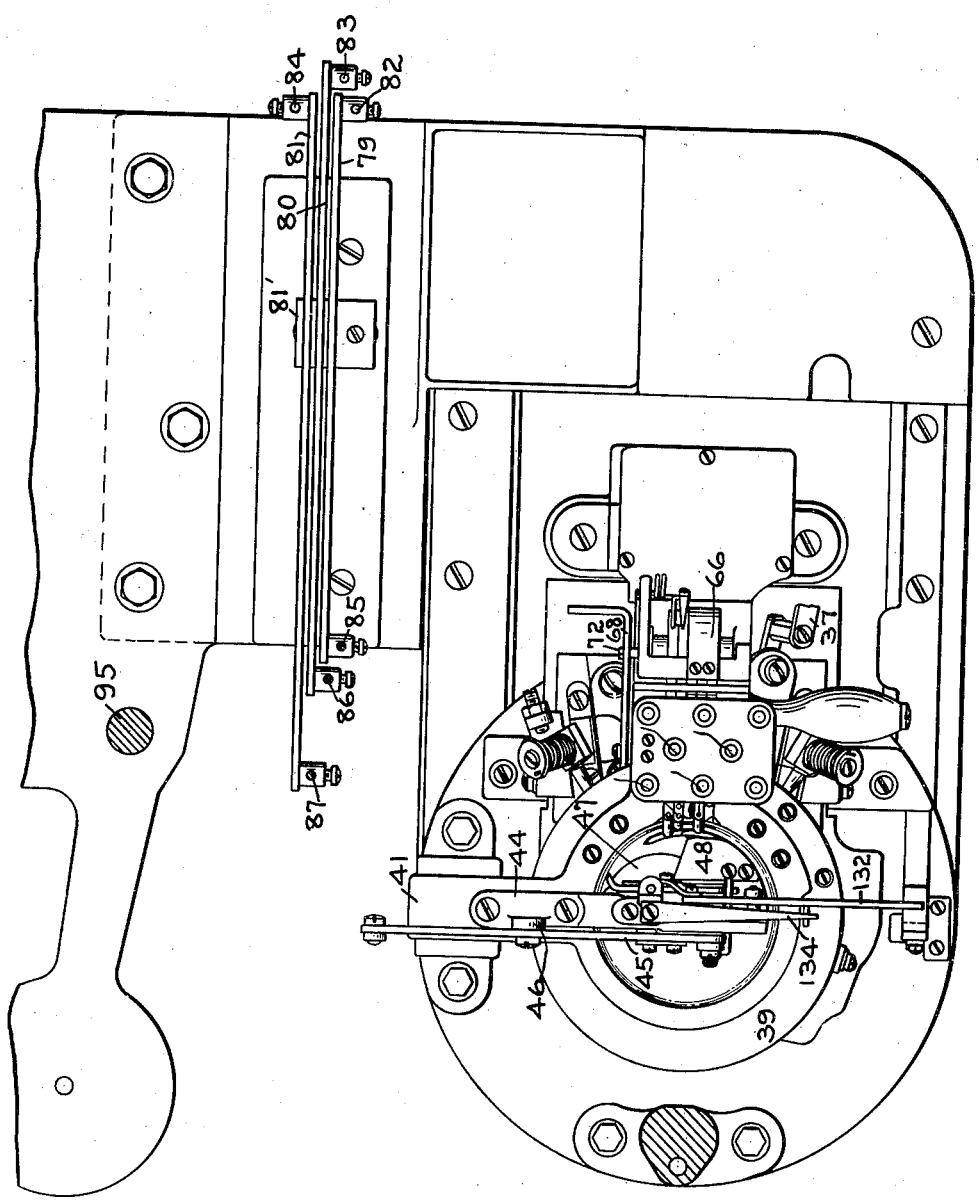

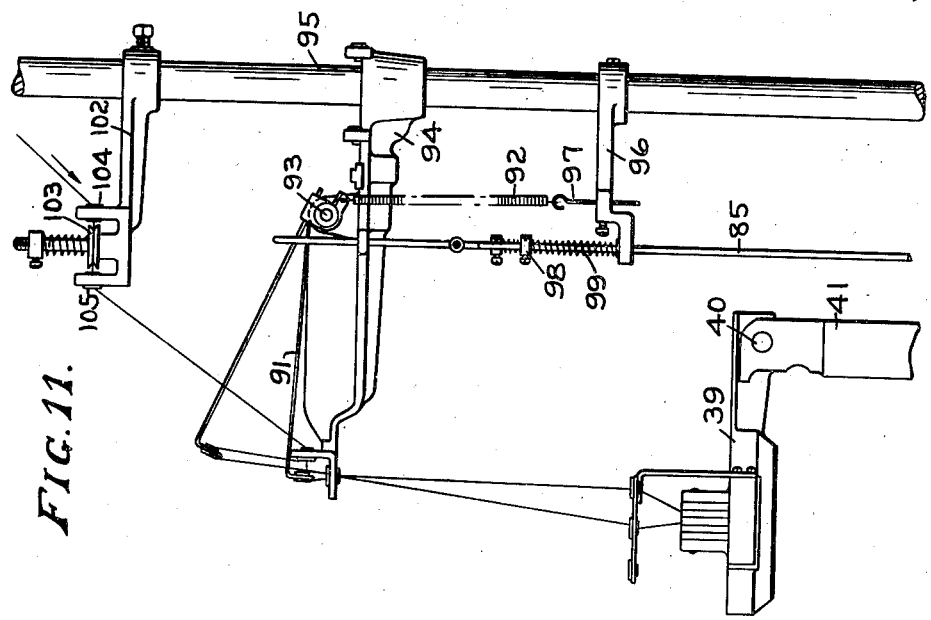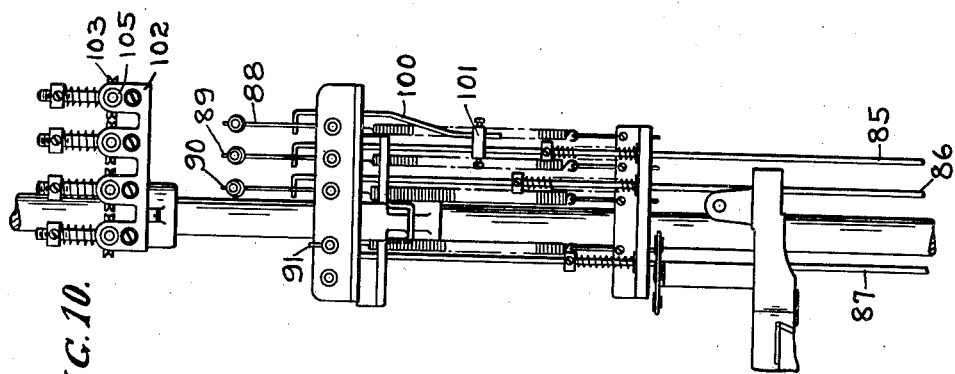

July 23, 1940.   R. H. LAWSON ET AL   2,209,061
METHOD AND MACHINE FOR KNITTING
Filed Oct. 1, 1936   14 Sheets-Sheet 9

INVENTORS:
ROBERT H. LAWSON,
AUGUSTIN GAGNE,
BY Roy F. Lovell,
ATT'Y.

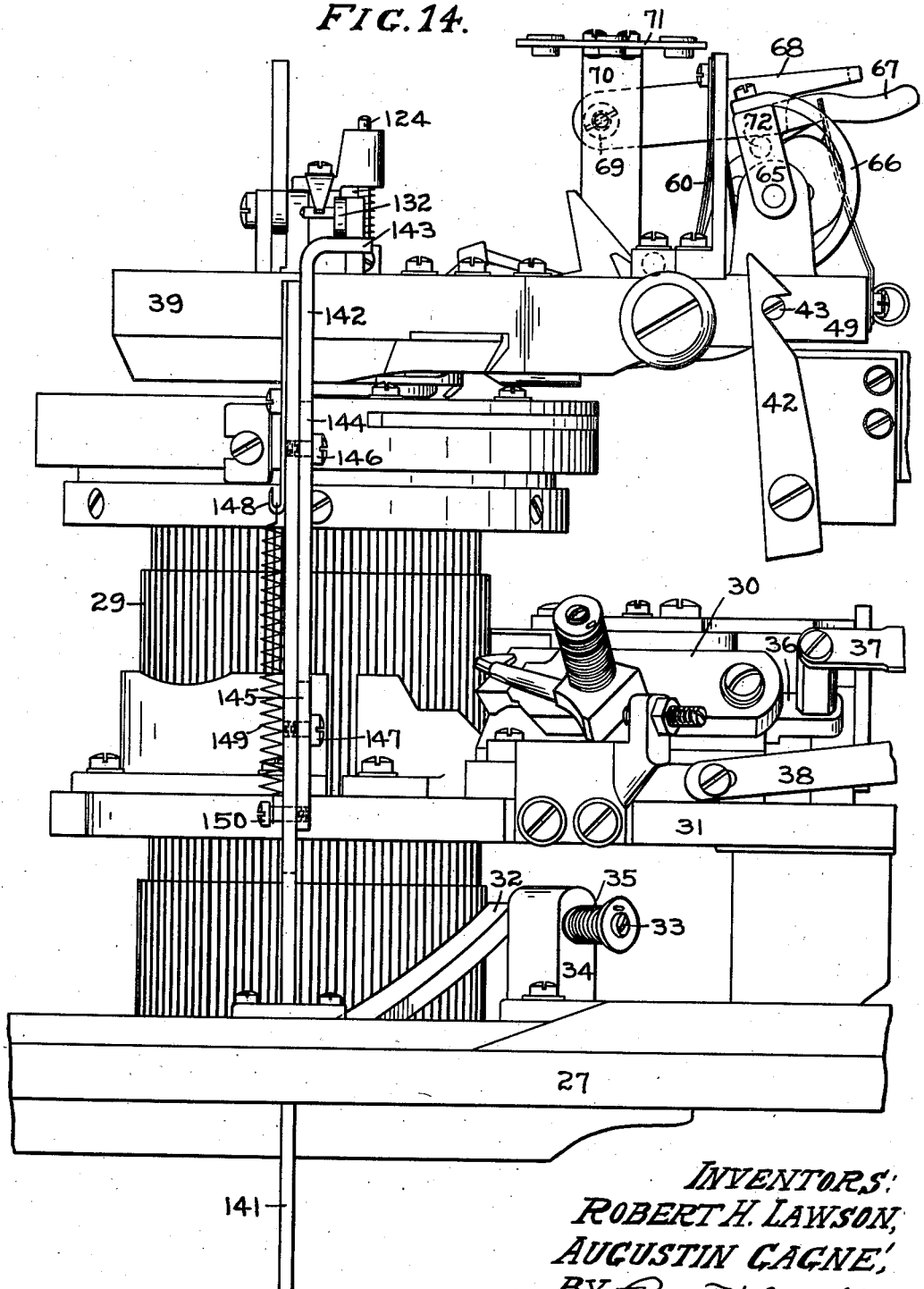

July 23, 1940.  R. H. LAWSON ET AL  2,209,061
METHOD AND MACHINE FOR KNITTING
Filed Oct. 1, 1936  14 Sheets-Sheet 11
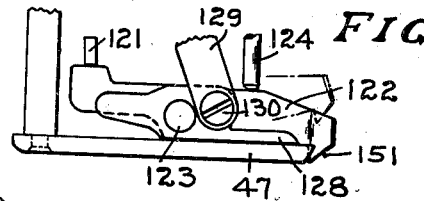
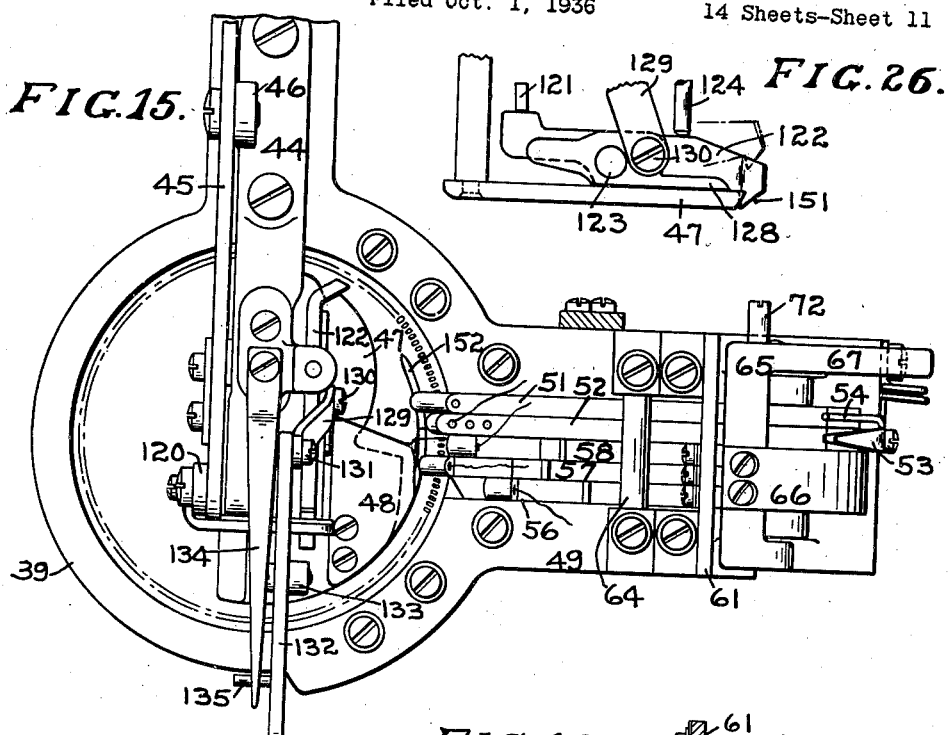
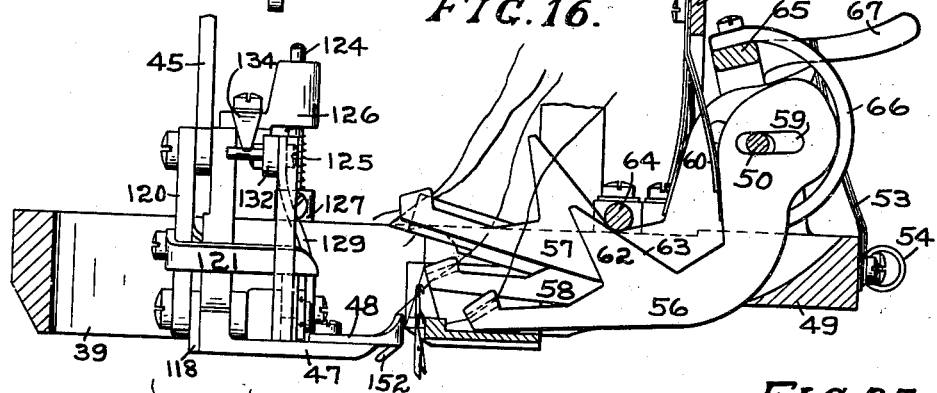
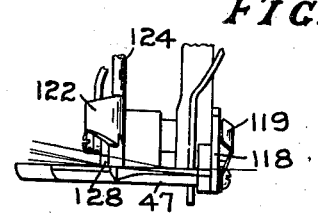
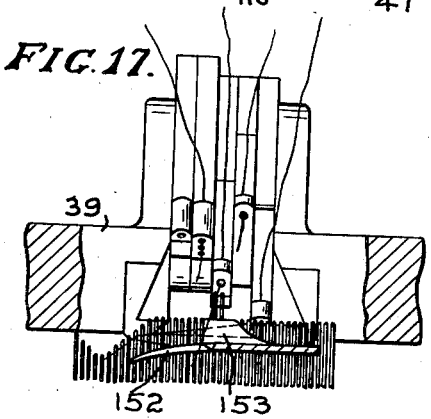
INVENTORS:
ROBERT H. LAWSON,
AUGUSTIN GAGNÉ,
BY Roy F. Lovell
ATTY.

July 23, 1940.  R. H. LAWSON ET AL  2,209,061
METHOD AND MACHINE FOR KNITTING
Filed Oct. 1, 1936    14 Sheets-Sheet 12

INVENTORS:
ROBERT H. LAWSON,
AUGUSTIN GAGNÉ,
BY Roy F. Lovell,
ATT'Y.

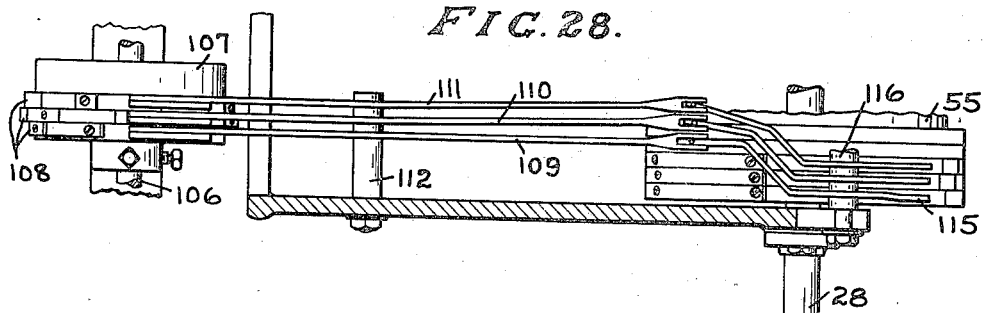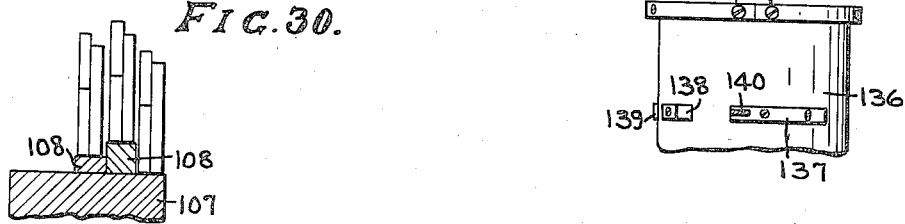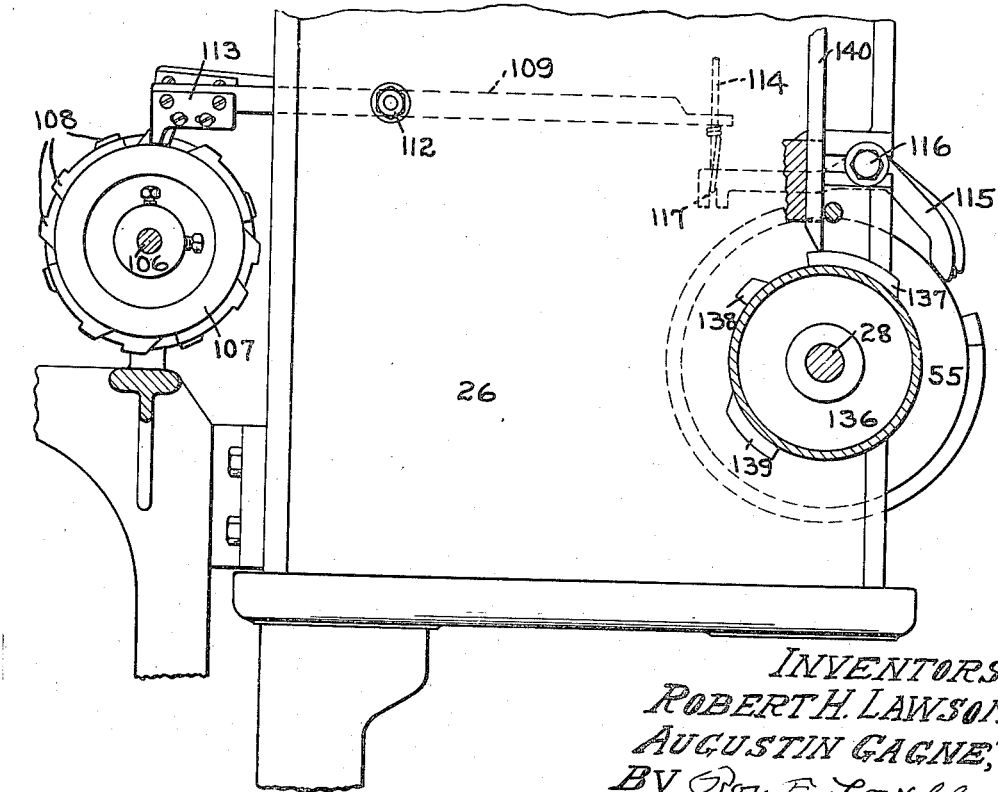

Patented July 23, 1940

2,209,061

UNITED STATES PATENT OFFICE 2,209,061

METHOD AND MACHINE FOR KNITTING

Robert H. Lawson, Pawtucket, and Augustin Gagné, Central Falls, R. I., assignors to Hemphill Company, Central Falls, R. I., a corporation of Massachusetts Application October 1, 1936, Serial No. 103,550
In Canada February 26, 1936

12 Claims. (Cl. 66—138)

This case deals with a method and machine for making a yarn change without clamping and cutting any of the yarns but wherein the yarns not appearing at the face of the fabric are wrapped on one or two needles and are floated across the back of these needles. This principle may be employed in knitting fabrics wherein the yarn change is incidental to horizontal striping, the yarns employed being of contrasting colors, and in another example elastic yarns either covered or uncovered may be incorporated in the fabric in spaced courses and the float between said courses bound into the fabric by means of a wrapping yarn knitted on one or two needles. Such knitting of rubber might be carried on throughout a stocking welt or in any fabric wherein it was desired to knit such an elastic yarn by skipping courses.

In the figures of the drawings:

Fig. 3 shows a section of fabric greatly enlarged wherein three different colored yarns have been knitted and the change on two needles being illustrated with one yarn floating and the other yarn wrapping about the two needles and binding the floats of the first yarn;

Fig. 4 illustrates a section of fabric wherein a rubber yarn has been knitted on spaced needles in every fourth course, having its floats from course to course bound in by another yarn wrapped about two of the needles;

Fig. 7 is an elevation showing a typical knitting machine to which our invention has been applied;

Fig. 8 is an elevation showing a side view of the machine of Fig. 7;

Fig. 9 is a plan view illustrating such parts of the machines as are seen below the yarn supplies and take-ups;

Fig. 10 illustrates the take-up mechanism as viewed from the front of the machine;

Fig. 11 shows these take-ups as seen from the side of the machine;

Fig. 14 is an elevation relatively enlarged showing the mechanism seen in Fig. 7 above the circular base;

Fig. 15 is a plan showing the latch ring, binder and cutter and the yarn feeding fingers;

Fig. 16 is a section taken below the center line of Fig. 15;

Fig. 17 is a sectional view showing a small group of needles just ins front of the mouthpiece as well as the other elements of the machine at that particular position;

Fig. 26 is a detail showing the main and auxiliary clamps in closed position;

Fig. 27 shows the binder as seen from another angle, the auxiliary clamp being closed and the main clamp and cutter being open;

Fig. 28 shows a fragment of the machine wherein cams for controlling the striping yarn guides have been illustrated in plan, also cams for controlling the auxiliary clamp;

Fig. 29 is an elevation showing the parts seen in Fig. 28 in greater detail; and Fig. 30 is a section taken through a portion of the striping yarn control drum at a position where yarn controlling levers contact cams thereon.

Figure 6:
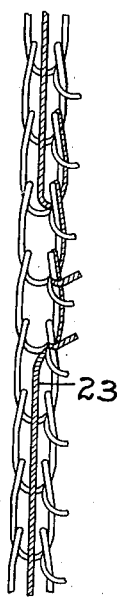
Fig. 6 shows in detail how the rubber yarn of Fig. 5 lies between the rib wales.
Figure 2:
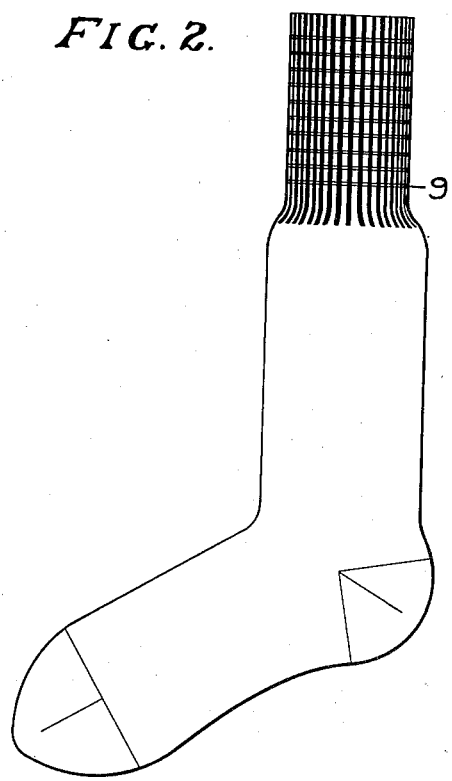
Fig. 2 illustrates the type of stocking welt wherein rubber would be knitted in the manner disclosed in this case.

As a first illustration of the work which is accomplished by our method and apparatus, a brief description will be given of the fabric illustrated in Figs. 1 and 3. It has been common practice in knitting horizontally striped fabrics to make the yarn change on a group of needles which may vary to some extent from course to course and to cut one yarn and bind it at about the same time another yarn is introduced. In the employment of this method it is not necessary to cut or bind any of the yarns once they have been introduced to the needles, and it is only necessary to control a very small number of needles which change will always occur and upon which a slightly thickened seam will appear, preferably at the back of the stocking where mock seams are frequently knitted. It is not necessary that two needles as have been illustrated be specially controlled but any reasonable number of needles may have yarn change occurring thereon, two needles being the number most satisfactory for all purposes. The fabric illustrated has three colors appearing consecutively throughout the length of the fabric but it is to be understood that we are not to be limited in number of colors except by practical considerations.

Assuming that the three colors illustrated in Fig. 3 are red, blue and white, the fabric being knitted towards the top, course 1 is knitted of white yarn and course 2 shows the change from white to red. At the wales 3 and 4 the white yarn was withdrawn and the red yarn inserted. The red yarn had been wrapping about the needles knitting wales 3 and 4 and the blue yarn had been floating from the last course in which it was knitted. The blue yarn now becomes the so-called wrapping yarn in wales 3 and 4 so that all three yarns are knitted in wales 3 and 4 of course 2. For four courses the red yarn will appear as the predominant yarn throughout the fabric and the white yarn will float along courses 5, 6 and 7, being retained tightly against the back of the fabric by means of the floats of the blue yarn which is being wrapped on the needles at which yarn change occurred. It may be seen that a mock seam is formed in wales 3 and 4 which does not appear bulky due to the fact that only two yarns are knitted on a pair of needles in most of the courses, one of these yarns tying in the float of the third yarn so that no loose ends or bulging floats are displayed.

In course 8 another yarn change is brought about wherein the red is withdrawn and the blue yarn previously wrapped in wales 3 and 4 becomes the predominent knitting yarn so that it is necessary to wrap the white yarn while the red float is being tied in by said white yarn. This scheme is carried forward for four courses whereupon the white yarn is returned to knitting on all needles, the blue yarn floats and the red wraps tying in said blue yarn. This illustrates a cycle including three color changes and the corresponding floating of one yarn and wrapping of another on the two needles upon which change was accomplished. It is to be understood that there is no limit to the number of courses upon which any particular color is to appear nor is it essential that the stripes be of uniform length, uniformity being evident in the fabric illustrated merely for convenience and for showing a simple pattern which may be easily interpreted.

In Fig. 4 a section of fabric has been shown wherein a rubber yarn 9 which may be covered or uncovered, has been knitted in every fourth course and on spaced needles as illustrated in the knitting of wales 10 and 11. It is not essential that the knitting of the rubber occur in every fourth course nor is it essential that it be knitted in spaced wales since it might be knitted continuously or might be laid in in a well-known manner. A so-called change has been made in wales 12 and 13 and it may be seen that said rubber yarn floats at 14 throughout the distance between courses 15 to 16. A secondary yarn 17 has been wrapped in courses 12 and 13 and the floats 18 of this wrap yarn tie in the longer floats of the elastic yarn. It will be noted that the elastic yarn is introduced in wales 12 and 13 after floating and that it is also knitted in these same wales as it is withdrawn to again float over several courses. This necessitates the knitting of the rubber in two consecutive courses on the needles which knit wales 12 and 13 so that the floats are really shorter by one course than the number of courses skipped or in which rubber is not knitted. This construction as illustrated in Fig. 4 assures that the rubber yarn is positively prevented from creeping or slipping within the fabric and also provides a scheme for tying in the floats, this feature being more important as the number of courses over which the float extends is increased.

Figure 5:
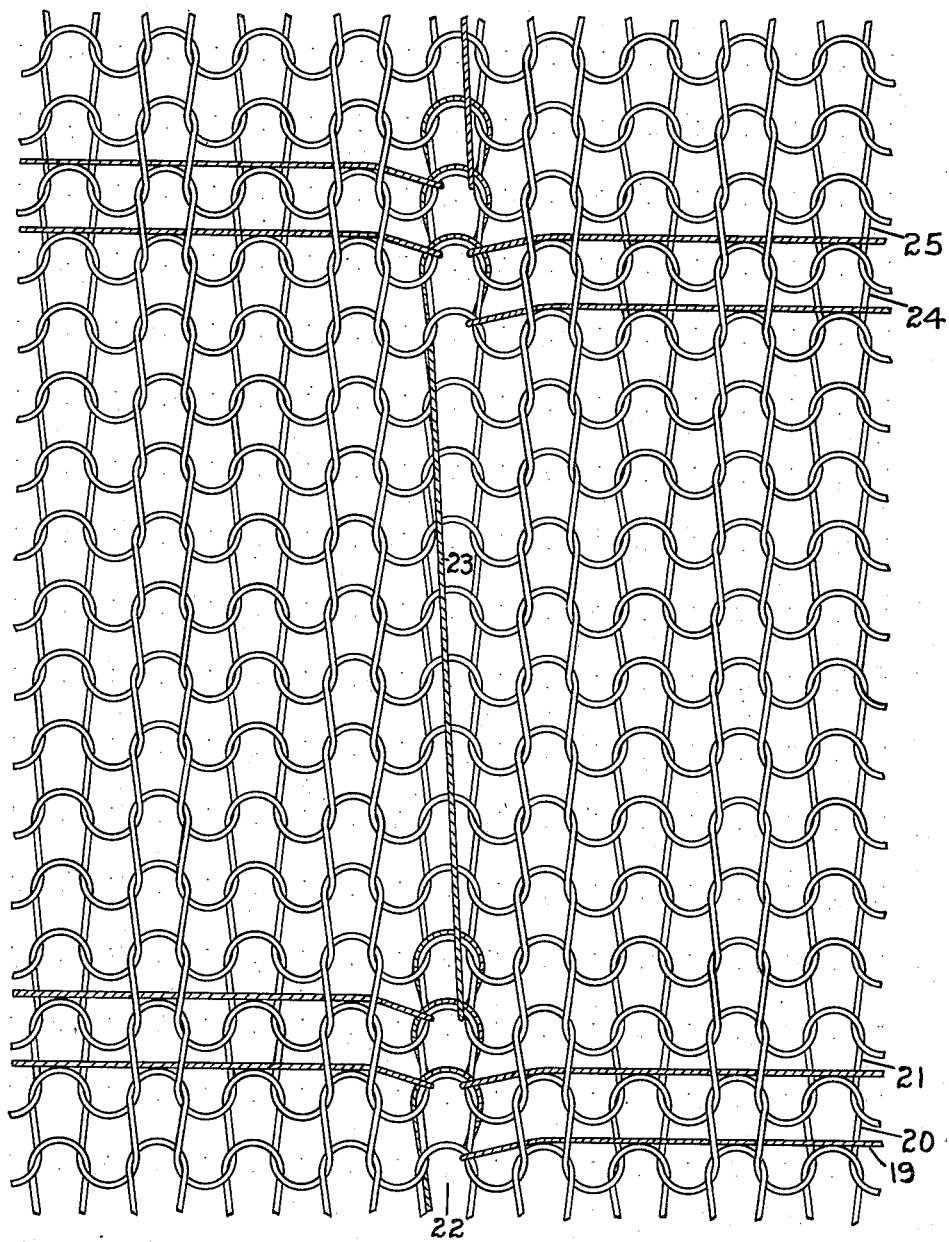
Fig. 5 illustrates a section of rib fabric having rubber knitted on a single needle and inlaid throughout the remaining needles, the said rubber yarn being floated over several courses and being hidden between rib wales.
Figure 12:
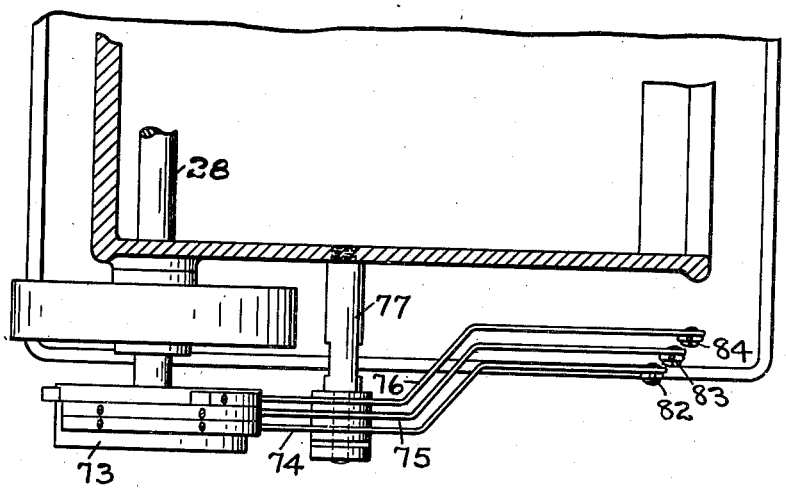
Fig. 12 is a view in section showing a fragment of the base and as much of the main cam structure as is necessary to operate the take-up.
Figure 13:
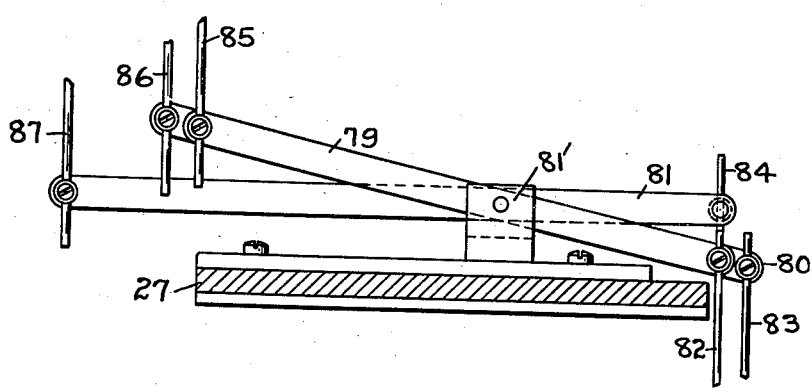
Fig. 13 shows interconnecting levers which convey the movement of the cams of Fig. 12 to the take-ups themselves.
Figure 18:
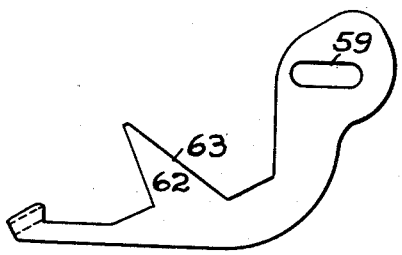
Fig. 18 is a detail of one yarn feeding finger.
Figure 19:
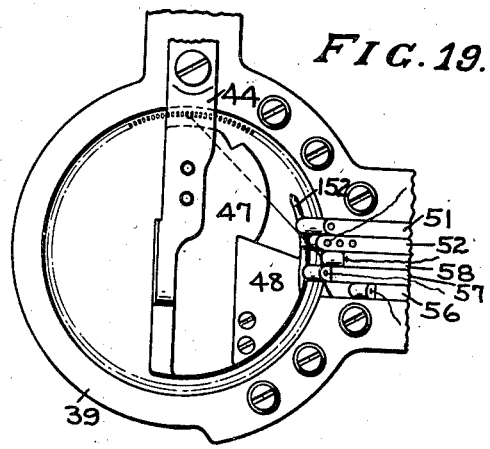
Figs. 19, 21 and 23 show progressive steps in the wrapping of one yarn about two needles at such positions in the fabric as it would not be knitted as a body yarn.

Referring to Figs. 5 and 6, a rib fabric has been illustrated being of the usual one and one rib although, within certain limits, the invention might be applied to rib fabrics having other combinations of rib and plain wales. The purpose of knitting in the manner shown with respect to these Figs. 5 and 6, is to hide the extending floats of a rubber yarn which has been knitted in spaced courses. A rubber yarn 19 is shown knitted into courses 20 and 21 on a single needle knitting wale 22, the said rubber yarn being inlaid between rib and plain stitches throughout the remainder of the fabric. It is quite possible that the rubber yarn might be knitted throughout some or all of the stitches in a course although the construction illustrated comprises the preferred form of the invention. After being knitted in wale 22 at the end of the course 21, this elastic yarn floats over several courses as illustrated at 23 until it is again knitted in courses 23 and 25.

Due to the fact that the stitches which go to make up wale 22 are drawn toward one face of the fabric while those in adjacent wales are drawn toward the other face of the fabric, Fig. 6, it can be seen that float 23 will lie within a channel between these series of stitches thus being very effectively hidden. The wale 22 is preferably a plain wale, that is, one drawn on a cylinder needle in the usual rib machine so that float 23 really lies at the back of the fabric and is not evident to anyone viewing the fabric from either side until the fabric has been stretched transversely. While the article is on display for sale this method of concealing the loose float will be found effective, and while the fabric is being worn the said float is not apparent since it is on the inside of the fabric.

Having disclosed examples of fabric which we intend to produce on our new machine and by a new method of knitting, a preferred embodiment of the machine itself will be described. The machine does not differ from the usual Banner knitting machine in many respects, but does have yarn feeding guides or fingers of novel type which are caused to function in accordance with a method not previously employed. The yarn binder has been modified and has an individual control which functions from the main cam shaft in addition to the usual control operated from the back of the machine. Yarn take-ups are controlled in a particular manner in order that they may take care of yarns fed to a small number of needles and which float during the major part of each revolution.

Figure 25:
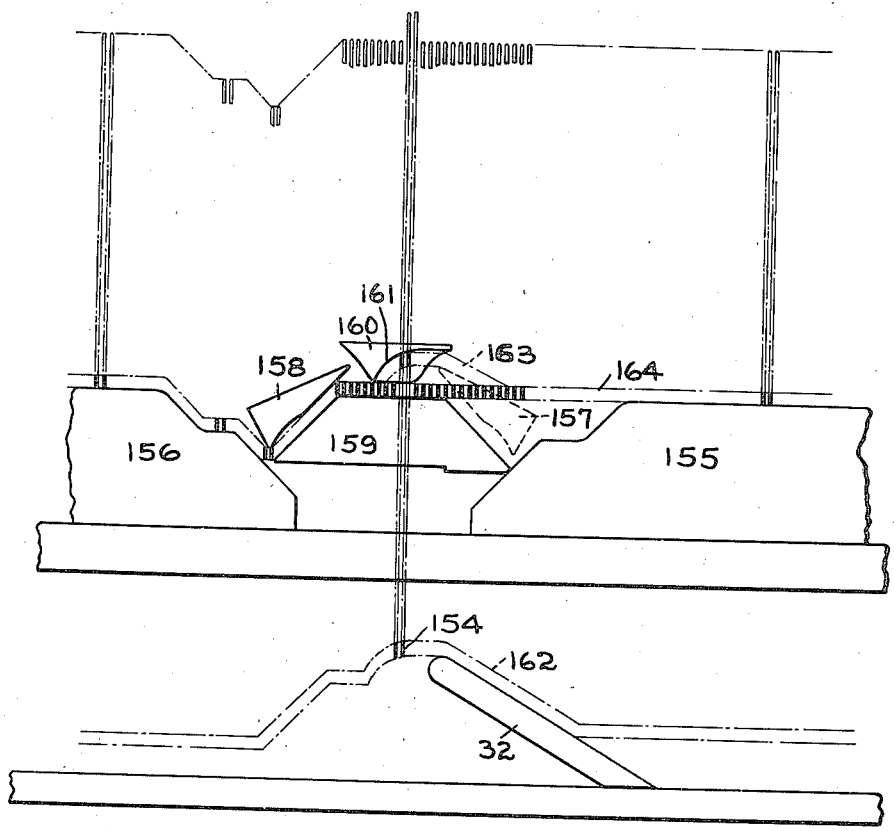
Fig. 25 is a diagrammatic view showing the cam group for functioning upon the needles and the jack cam which actuates needles upon which change occurs.

Referring to Figs. 7, 8, 9 and 14, a knitting machine is illustrated having a frame 26, base 27, main cam shaft 28 and cylinder 29 having latch or other needles therein, this cylinder being rotated in the particular example herein being used for illustrative purposes although said cylinder might be stationary. The usual cam group generally indicated at 30 is mounted upon a plate 31 and comprises a pair of stitch cams, a center cam, guard cam and needle raise cams. These cams will be described in greater detail with reference to Fig. 25 as well as the function of jack cam 32 pivotally mounted at 33 on a support 34 attached to the circular base, this jack cam being for the purpose of raising jacks under those needles upon which change of yarn is to be accomplished. A coil spring 35 normally maintains said cam 32 in the position shown in Fig. 14, but allows that cam to be lifted as will be necessary during reciprocating knitting. One of the stitch cams is slidably mounted on a stem 36 and may be withdrawn at appropriate intervals by link 37 and other mechanism well-known for this purpose. The entire cam block 30 may be withdrawn for transfer by means of a link 38, this also being a well-known function of such machines which need not be described in this case.

A latch ring 39 is hinged at 40 on latch ring post 41, Fig. 8, and is to be held in operative position by means of a latch 42 which hooks over a pin 43. This latch ring carries a bracket 44 to which is attached a binder and cutter of conventional Banner construction and which is caused to function by lever 45 pivoted at 46 and being operated by linkage which passes down at the back of the knitting machine. This binder also includes the usual binder plate 47 and also a float yarn guiding member or plate 48 attached to plate 47. The function of the element 48 will be described with respect to Figs. 19-24.

Referring to Figs. 7, 9, 14 and 15-17, we will describe the construction and operation of our new yarn feeding fingers by means of which it is possible to knit the fabrics which have been illustrated. The latch ring is provided with an extension 49 which carries a series of yarn feeding guides or fingers herein shown as five in number although the number may be more or less than five. A pivot pin 50 carries two yarn fingers 51 and 52 which are conventional in their character and merely swing about said pivot point having springs 53 and 54 to hold them in a feeding position except at such times as a finger is lifted to inoperative position by the usual yarn finger controlling devices which function from cam drum 55 on the main cam shaft 28. None of this mechanism is illustrated for the reason that it has become so well-known in machines of the type and that illustrations are available in patents showing the Banner machine, one example being U. S. Patent #933,443.

Three specially constructed fingers 56, 57 and 58 are arranged to swing about pin 50 and also to slide radially of the machine thereon. This latter function is made possible by slot 59 which encompasses pin 50. Each of these fingers 56—58 is controlled in such a manner that upon elevation of a finger, it will slide inwardly to a position very close to the needle circle and when in extreme elevated position the yarn guiding end will project to the inside of the circle. Each finger has a leaf spring 60 attached to yoke 61 which spring urges the finger outward away from the said circle of needles. About mid-way between the yarn guiding end of the finger and slot 59 is a projection 62 having an inclined cam edge 63 which bears against a short bar 64 projecting across the extension 49 and above each of the guiding fingers. From an inspection of Fig. 16 wherein yarn guides 56—58 are illustrated in three positions, it can be seen that this cam edge 63 forces a finger to slide radially inward of the needle circle as that finger is elevated to an intermediate feeding position or to an inactive position. Finger 56 is illustrated in lowermost position wherein it is feeding its yarn to all the needles as they pass the mouthpiece. In this position the yarn guide is allowed to move outwardly from the needle circle to greatest extent. Yarn guide 57 is illustrated in opposite extreme position, that is, a position in which it does not feed its yarn to any needles but floats its yarn instead. The inner guiding end of that finger projects within the needle circle to an appreciable extent. Finger 58 is illustrated in intermediate position, the yarn guiding end having been moved inward to a position very close to the needle circle. This guide 58 will feed its yarn to be wrapped about only those needles which are specially controlled and upon which yarn change and binding of the float threads is accomplished.

Referring to Figs. 14, 15 and 16, it will be noted that a yoke 65 has been arranged to swing upon pin 50 and that this yoke carries a semi-circular element 66 of a width sufficient to contact all three of the yarn guides 56—58 at a point below said pivot 50. A handle 67 is formed in extension of said yoke, and by means of this handle, the operator may raise all three of the guides to an inactive position merely by pressing down on the handle. Referring to Figs. 9 and 14, a latch 68 is pivoted at 69 on the upright post 70 which projects from the upper surface of the latch ring extension and carries a plate 71 with porcelain yarn guides therein through which the several yarns are threaded. This latch 68 drops behind a pin 72 projecting from yoke 65 and will hold guides 56—58 in inoperative position until the machine operator raises latch 68 whereupon the springs 60 will return each of the guides to a position as controlled by the main cam drum.

Now referring to Figs. 7-13, the control for the yarn take-ups will be described. The main cam shaft 28 has a drum 73 upon which are arranged series of cams in three different vertical planes. These cams work upon three levers 74, 75 and 76, each freely pivoting on stud 77 and each having a hardened cam follower 78 which may be adjusted upon the end of its respective lever. Three other levers indicated at 79, 80 and 81, pivoted on bracket 81' attached to base 27, respectively receive motion transmitted from the ends of the three lower levers by means of interconnecting links 82, 83 and 84 which are pivoted to the said lower levers and also to the levers 79-81. Each of the links is adjustable for length in a well-known manner.

At the other end of levers 79—81 three similar rods or links 85, 86 and 87 respectively, transmit motion to the take-ups themselves by drawing down on the take-up arms. In Figs. 10 and 11 these rods 85—87 are illustrated as operating upon a series of take-ups 88, 89, 90 and 91 which tend to be maintained in the position assumed by take-ups 88—90 by means of tension springs generally indicated by numeral 92. The take-up arms are pivoted at 93 on bracket 94 which is in turn fixed to the post 95 all in a manner previously known and described with respect to Banner machines. Another extending bracket 96 is fixed to the post 95 and has a series of hooks 97 to which the springs 92 are fixed at their lower ends and also provides guiding apertures through which the rods 85—87 project and by means of which they are maintained in proper alignment. Each of these rods has a collar, one of which is indicated at 98, between which and the bracket 96 is interposed a compression spring 99. This spring maintains each of the rods 85—87 in disengaged position with respect to the take-ups 88—91 except at such times as an appropriate cam on drum 73, acting through the mechanism just described, will draw its rod and thus the corresponding take-up to an inactive position such as illustrated with respect to take-up arm 91.

Rod 85 serves to control both take-ups 88 and 89 since an auxiliary rod 100 is affixed by means of element 101 clamped to both rods 85 and 100 to function with the main rod 85.

A third bracket 102 is secured to post 95 and carries a series of disc tensions 103 through which each yarn passes between the guides 104 and 105. These disc tensions are adjustable in the usual way and serve a purpose too well-known to be described to greater extent in this particular case. The particular manner in which these take-ups function will be described with respect to the operation of the machine, which description will be made at the end of this case.

Now referring to Figs. 28, 29 and 30, we will describe the mechanism employed to control the yarn fingers which operate to feed the striping yarns. At the back of the frame, a shaft 106 carries a pattern drum 107, having thereon three rows of cams. One of these cams is designated by numeral 108 and it will be noted that each such cam has operating surfaces at two different levels. Three levers 109, 110 and 111 are free to pivot on a stud 112 suitably attached to the frame of machine, each lever having adjustably fixed at one end a toe or follower 113 which bears upon the respective row of cams on drum 107. Each of the levers is forked at the other end to engage about a yarn guide control wire, one of which is indicated at 114. These wires are standard equipment in such machines and are normally caused to lift their respective yarn guides to an inactive position by means of cams on drum 55. As is well known to those familiar with the Banner type machine said cams function upon levers 115 rotatable at 116 and engaging a loop in the lower end of each wire as illustrated in Fig. 29.

The three yarn guides 56, 57 and 58 will be caused to enter and to be withdrawn from feeding position throughout the leg, heel, foot, and toe of the stocking in the usual way by means of said levers 115, cams on the drum 55, etc. After a guide 56, 57 or 58, or all of them, has been moved into an operative position, the manipulation of that guide throughout its three distinct positions will be governed by cams 108, levers 109, 110, 111 and the other mechanism under control of the wires 114. Drum 107 may be rotated in any convenient manner, preferably in a manner similar to that employed in all Banner machines capable of horizontal striping, and further, cams 108 may be arranged in different ways upon the drum according to the particular pattern or design which is to be knitted. The particular set-up herein shown is that which would be employed to knit the fabric illustrated, but it is to be understood that this is merely given by way of example and that many other patterns and other arrangements of the cams would be obvious to anyone skilled in the art.

From the construction of levers 115 which have slots 117 within which the loops in the ends of wires 114 engage, the other levers 109, etc., may draw their respective wires down without interfering with levers 115. Likewise levers 115 are quite free to draw down their accompanying wires without any disturbance of the other system of control since the wires 114 may move freely within the slots in the forked ends of levers 109, 110 and 111.

Now referring to Figs. 9, 14–17, 26 and 27, certain modifications with respect to the binder and its control will be described. This binder has practically all of the common elements incidental to such binders and consists more specifically of a bracket 44, a control arm 45 pivoting on lug 46, said arm 45 being controlled from the main cam shaft to open and close the clamp and cutter at appropriate intervals. The cutter is shown at 118, Fig. 27, and is maintained in cutting engagement with a plate by means of spring 119. In Fig. 16 a link 120 connected to arm 45 functions to move the cutter for severing the yarn or yarns at such times as they are taken within the binder. An extended finger 121 bears upon one end of the main yarn clamp 122 which is free to pivot at 123, this clamp being maintained in a yarn engaging position by means of plunger 124 bearing upon the upper forward end of element 122. A spring 125 bearing under guide 126 and upon collar 127 serves to tension the clamp 122 for the purpose of binding its yarns with a suitable amount of restraint.

The clamp 122 is used to restrain all of the yarns and in addition, a separate binder 128 comes into play by special control at certain times for holding the three striping yarns while the main binder is being opened. This auxiliary clamp 128 is also pivoted at 123 and is operated by means of a link 129 connected at 130 to the pivot clamp itself and at the other end 131 to a lever 132 which is in turn free to swing about a pivot at 133. A spring 134 bears on a pin 135 projecting from the lever and is always tending to swing clamp 128 into open position.

Now referring to Figs. 7 and 14, a drum 136 on main cam shaft 28 carries a series of cams 137, 138 and 139, thereon, Fig. 29, which act upon a rod 140 which projects upwardly and connects onto another extension or rod 141 for controlling the striping yarn clamp 128. Rod 141 passes up through the base of the machine being guided therein, and then, by means of another rod 142 having an end 143 bent at right angles, controls the auxiliary clamp. This end 143 bears under the outer end of lever 132 and when the rod 140 is raised by any one of the cams 137—139, will close the auxiliary clamp against the tension of spring 134. For the purpose of providing a resilient clamping action and for taking care of inaccuracies in the height of cams 137—139, rod 142 has slots 144 and 145 within which screws 146 and 147 threaded into rod 141 are free to slide. A hook 148 attached to rod 141 has a spring 149 attached thereto and connected at its other end to a screw 150 threaded into element 142 and passing through a slot in the rod 141. This spring has a slightly greater tension than spring 134 and when rod 140 rides up on any one of the cams, will close the auxiliary clamp but is sufficiently flexible to admit of excessive movement in the rod 140 without straining any of the parts of the clamp.

The main clamp 122 has been bent outwardly relative to the edge of plate 47 as illustrated in Figs. 15 and 27, and also has a part which projects downwardly below the upper edge of the plate and at a suitable angle for guiding floating yarns under the plate at such times as they are not to be taken within the binder. In Fig. 26 one of these yarns is illustrated at 151 as it is passing down the inclined edge of the clamping element to be guided underneath the plate. When this clamp 122 is raised, Fig. 27, the inclined edge serves to guide yarns into the binder itself where they will be held after they are cut. A more detailed explanation of the clamping action will be given later with respect to the operation of the machine.

The floating threads will be guided between plate 47 and restraining element 48 which carries a peculiarly shaped extension 152, better shown in Figs. 15, 16 and 17. The element 48 has been built up at 153 so that the so-called wrapping yarns which are floating except where knitted in on two needles, more or less, are positively prevented from getting into the hooks of any other needles. The projection 152 holds the floating yarn in the form of a loop thereabout until the needles have passed the mouthpiece and after the wrapping needles have again taken their yarn.

We will now describe the method and mechanism for separating needles which are to knit the wrapping threads and upon which yarn change is to be accomplished. The needles would be divided into substantially equal groups of long and short butt needles as is the common practice with hosiery machines, and the needles upon which change is to be accomplished would have jacks associated therewith, these jacks being indicated as having butts 154. Needles travel about the machine passing over raise cams 155 and 156 which maintain needles at a position wherein loops hanging thereon would hold the latches open. The particular construction herein illustrated requires a clearing cam to be used which must clear the latches of all needles prior to a time when they approach the yarn feeding station and knitting cams. It has not been considered essential to illustrate this clearing cam in the present case since they are quite common in the knitting art and the particular cam which we propose to employ has been clearly illustrated and described in copending United States application Ser. No. 541,856, now Patent No. 2,101,006. Any other conventional clearing cam might be employed without departing from the original concept of the invention.

The main cam block which was generally indicated by numeral 30 in Fig. 14 and which is more or less conventional in its general characteristics has a pair of stitch cams 157 and 158, a guard cam 159 and a specially constructed center cam 160. The stitch cam 157 is movable to an inactive position by means of cam control acting through link 37 connected to the stem 36 of the cam as previously described. Center cam 160 has a butt engaging surface 161 which controls the two needles illustrated as being raised to a greater height than other needles for purpose of taking the yarn upon change and for taking the wrapping thread which ties in the long floats.

Jack cam 32 previously described in some detail is shown in this diagrammatic illustration as well as the path 162 through which the jack butts travel. These jacks control the two needles before mentioned and raise them to a height indicated by the pathway 163 while the remaining needles continue along in the horizontal path 164 taking yarn at a lower level and knitting under cam 158. Of course, in reciprocatory knitting, cam 157 is brought into play in the usual manner and short butt needles pass through the cams in alternating directions to knit the heel and toe of a stocking. During reciprocatory work it is possible for the jacks to pass down under cam 32 on reverse strokes of knitting and the construction of the cam allows it to be raised for permitting said jack butts to pass under it.

Figure 20:
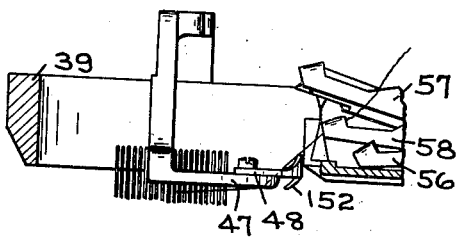
Figs. 20, 22 and 24 are sectional views taken through Figs. 19, 21 and 23, respectively.
Figure 21:
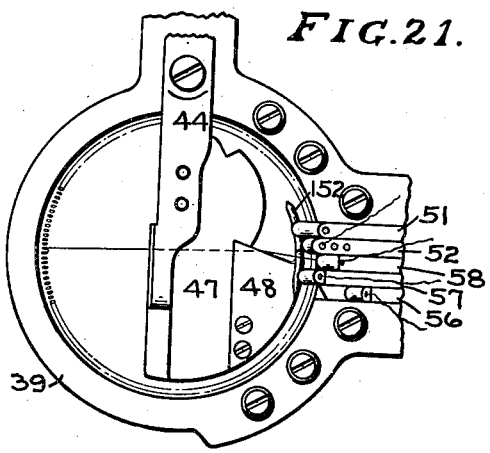
Figure 22:
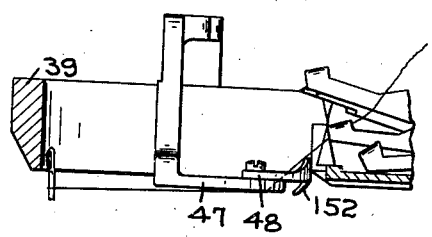
Figure 23:
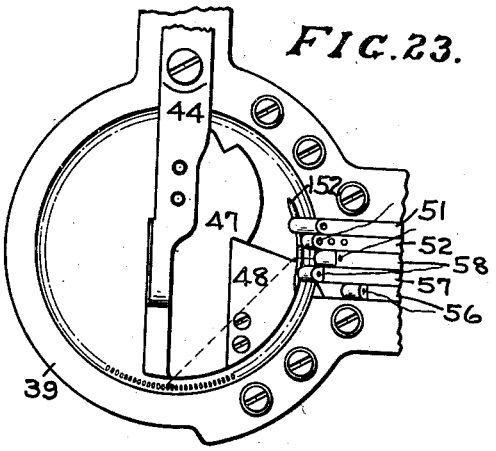
Figure 24:
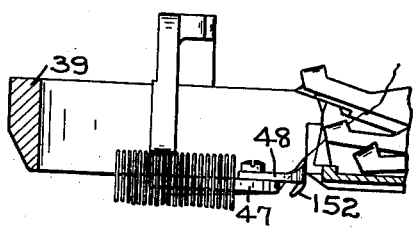

Now that the mechanism of the machine and the general way in which it functions have been described, we will continue by describing the operation of the machine in knitting such a fabric as has been shown in Fig. 3. Figs. 19–24 show the positions of yarn guides and illustrate the manner in which the wrap yarn is floated as it ties in the long floats (not shown in these figures) on the two or more needles whereupon yarn change is made. With the machine illustrated, such a stocking top as is usually employed would be transferred to the needles of the machine whereupon knitting would commence in the ring top or the leg of the stocking. It is not essential to knit a ring top, however, it is preferable to do so before starting knitting of the leg with one of the colored striping yarns. After transfer of the top to the needles said ring top yarn would be thrown into action and a few courses knitted therewith, the three colored striping yarns would be held underneath both the main and auxiliary binders at this time. At the termination of the ring top one of the striping yarns, in this example the red yarn fed by yarn guide 56, would be brought into action as the ring top yarn was taken out of action. This would be accomplished with the usual overlapping of the two yarns to prevent any formation of an eyelet. It would be essential at this time to open the main binder 122 so that the ring top yarn might be taken therein to be cut and held and at this particular time cam 137 functioning through mechanism before described will cause the auxiliary clamp 128 to bind those yarns which were being held by binder 122. After the ring top yarn has been cut and bound by the usual process the auxiliary clamp will be opened and will remain open until the starting of the heel. Now assuming as we have that the red yarn is to be the first striping yarn introduced, yarn guide 56 will be moved down to the position illustrated in Figs. 16 and 20 and would remain in that position so long as the red yarn was used as a continuous knitting yarn. Under the control of cams 108 on drum 107 yarn lever 58 would have been moved to intermediate position as illustrated in Figs. 16, 20, etc., while lever 56 was feeding the striping yarn to all the needles and lever 58 would feed its yarn which we have assumed to be blue, to the needles upon which change would occur, in this case the two needles controlled by jacks. The said two needles have been illustrated in Figs. 19, 21 and 23 as having the blue yarn wrapped thereabout, said yarn floating as illustrated in these figures. It is the function of the built-up projection 153 to prevent the wrapping yarn from getting into hooks of any needles except those upon which the yarn is to be wrapped and whereupon an elongated float of the third yarn will be tied in at each stripe after the first. This wrap yarn float is indicated in the figures as it is guided under plate 47 by means of the beveled edge on clamp 122 and is held within the space between plate 47, restraining element 48 and projection 152. During this time the guide 57 which is still in uppermost position and projecting within the needle circle to a degree has its yarn clamped beneath binder 122 and probably under the auxiliary binder if rod 140 has not yet run off the end of cam 137.

For the next stripe, which we will assume to be blue, the color which was being fed to the jack controlled needles as a wrapping yarn, guide 58 will be brought down to lowermost position before the jack controlled needles get to the knitting point and just as the change is made, guide 56 which was feeding red yarn will be moved to uppermost position so that its yarn will not be taken by any needles after those upon which change always occurs. Guide 57 which was inactive during the knitting of the first stripe will now come into intermediate position and its yarn, the white yarn, will wrap said jack controlled needles and will also tie in an elongated float of the red yarn, this yarn floating as shown since it is held within the needle circle and can not be taken by any needles. None of the yarns are clamped or cut as has been the practice in most striping machines of the prior art. During the knitting of this blue stripe the same procedure follows as occurred throughout the knitting of the red stripe with the exception of this additional long float formed by the last employed striping yarn. It can be seen that the first wrapping yarn, the blue yarn need not have been introduced except for the fact that the machine has been so constructed that the yarn guides were necessarily moved to introduce that yarn even though it was not needed until the first change from one color to another. After the first stripe all three yarns appear in the fabric until after the knitting of the heel.

The movement of guides throughout the following yarn change will be obvious and it is not considered necessary to go into any further description of that in this case. At the start of the heel it will be necessary to throw the heel yarn into action and this heel yarn may be the same yarn which was knitted in the ring top. It will also be necessary to open the main clamp to receive the striping yarns and to bind and cut them, it being understood that the auxiliary clamp must be open at the same time. After rod 140 dropped from cam 137 this auxiliary clamp remained open throughout the knitting of the leg, but just before the heel yarn is to be introduced, this axiliary clamp will be closed for a very short space of time to prevent said heel yarn from being pulled from the binder as a result of the take-up action. This closing of the auxiliary clamp will be accomplished by cam 138 which it will be noted extends through a very short arc on the cam drum which is just sufficient for closing the clamp while the yarn is being taken to be held within the needle hooks, but will allow this auxiliary clamp to open in time for the striping yarns to pass underneath it as well as under the main binder. The heel yarn will be controlled in the usual manner to be introduced at the start of the heel and the three striping yarns will be removed from action by control of cams on the cam drum 55. Just as soon as the striping yarns, which have discontinued to knit, pass under the binders and within the cutter these elements will be closed by means of the usual binder control. The heel will be knitted in the usual way and the pattern control on drum 107 will discontinue its movement at the start of the heel so that it may come into action in exactly the same place which it left off when knitting of the foot commences.

After knitting the heel the striping yarns will be brought into action for knitting the foot in the same way they were moved into action at the beginning of the leg; preferably, the heel would commence at the termination of one of the stripes but it is not necessary since the yarns would be returned to the exact position they occupied at the start of the heel and a partially completed stripe would be finished under the pattern control illustrated. It is of course obvious that the auxiliary clamp would have to be closed just prior to starting the foot so that the striping yarns would not be prematurely released from the binder as it was opened for clamping and cutting the heel yarn. Cam 139 functions for this purpose.

At the beginning of the toe the striping yarns will again be taken within the binder in the same manner in which they were taken at the start of the heel and it will not be necessary to go into any detail as to such action. Obviously the auxiliary clamp will have been allowed to open before the start of the toe. The machine may go directly into knitting of the toe or a ring toe may be knitted between the foot and the toe itself. After knitting the toe and loopers rounds the stocking will be completed and the usual retiming mechanism will have returned all elements to proper position for the starting of a new stocking.

The take-ups before described function in a more or less conventional manner and are rendered inactive as their yarns are respectively moved to non-feeding positions. The take-ups are released as the yarns are fed and function in the usual way to permit all the yarns to float, etc. Since the yarns governed by take-ups 88 and 89 always function together, a single control for these take-ups is found sufficient.

Figure 1:
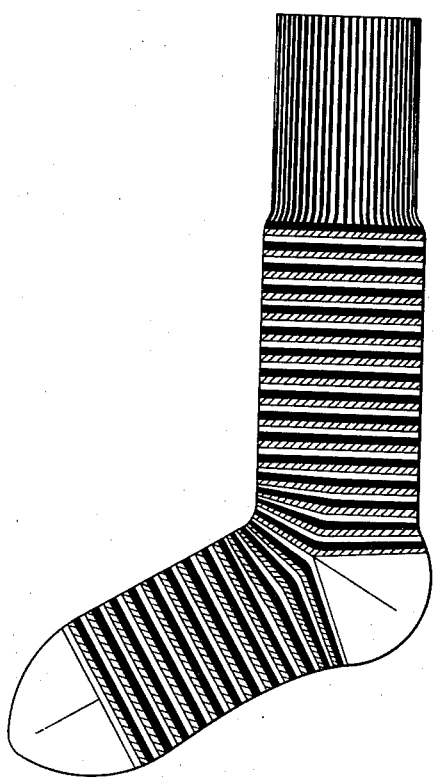
Fig. 1 illustrates a stocking having horizontal striping of three contrasting colors, the change from one color to another being brought about by means of the invention herein described.

The operation of the machine has been described relating to knitting a three colored, striped fabric such as shown in Figs. 1 and 3 but from the description it is obvious that the other fabrics illustrated could be made on the same machine and it is not believed a further description relative to them is necessary in this case. It is obvious that within certain limits change in pattern might be made so that various lengths of stripes could be knitted, further, the stripes might be made to appear in different sequence acoording to a more intricate arrangement of the pattern drum. The description has been more or less specific as to the machine employed but the invention is applicable to all machines of the type described and as before stated, it is not necessary to control two needles by means of jacks, but any reasonable number of needles may be controlled so that change will always occur at those needles and that one of the yarns will be bound in by the wrapping floats of another so that a seam will be formed which does not appear bulky or unsightly. It is to be understood that this description is to be taken as illustrative and the scope of the invention is not to be limited except by the claims themselves.

We claim:

1. A method of controlling yarn for horizontal striping wherein all yarns are continuously incorporated in the fabric including the steps of feeding one yarn as a predominant striping yarn to a series of needles, floating another yarn throughout the stripe produced and tying in this float by wrapping a third yarn in a narrow panel throughout the length of the stripe.

2. A method of controlling yarn during horizontal striping with more than two colored yarns including feeding one striping yarn throughout a plurality of courses, floating another yarn over said courses and wrapping a very few needles with a third yarn in such a way that the floats of the wrap yarn tie in the floats first mentioned.

3. In a knitting machine of the type described a plurality of yarn guides for feeding yarns to needles of said machine, each guide being movable to three positions, one in which it will feed to all needles, another in which it will wrap its yarn on selected needles and a third position in which it will feed to no needles and means for selectively moving these guides throughout said three positions to effect horizontal striping.

4. A knitting machine of the type described having a series of needles and means for feeding at least three yarns to said needles, said means including yarn guides movable to different positions wherein when one guide is feeding its yarn to all needles, a second guide will wrap its yarn on selected needles only and the third guide will be moved to a non-feeding position, and pattern means associated with said machine and connected to control said yarn guides to move throughout said three positions for feeding the yarn to the needles in alternation so as to produce horizontal stripes.

5. In a knitting machine, a needle cylinder and needles therein, a plurality of yarn feeding guides mounted for feeding yarns to said needles, said guides having a pivoting and sliding movement within their supports, means for selectively moving said guides to any one of three positions and cam means intervening between the guides and the support to move the guides radially of the cylinder and resilient means for moving them in the reverse direction.

6. In a knitting machine, a plurality of pivoted yarn guides movable to and from yarn feeding position, means for engaging all of said guides for simultaneously moving them to inactive position and means engaging said first mentioned means for locking said guides in that position.

7. In a knitting machine of the type described, a binder including a main yarn clamp and a cutter, means for operating said clamp and cutter and pattern control for the same, an auxiliary clamp normally maintained in open position and pattern means for operating said auxiliary clamp at predetermined intervals.

8. In a knitting machine of the type described, a yarn binder including a clamp and a cutter, means for operating said clamp and cutter including pattern control on the knitting machine, an auxiliary clamp functioning independently of the main clamp, means for maintaining said auxiliary clamp in open position during normal operation of the machine, and pattern controlled means functioning independently of the first pattern controlled means for closing said auxiliary clamp.

9. In a knitting machine, the combination of a series of independently operated needles, means for selecting some of said needles to take yarn at a height above that at which the needles would ordinarily take yarn, a plurality of yarn guides movable to and from positions wherein they may either feed striping yarn to all needles, to selected needles or to no needles and pattern control means for periodically moving said guides in proper sequence, a yarn binder and cutter and an auxiliary clamp associated therewith and operated by separate control from that which would cause the main binder to function, whereby a plurality of striping yarns may be knitted in alternation without binding or cutting any of the yarn during striping.

10. In a knitting machine of the type described, a series of yarn guides movable to three positions, cam control and means functioning from said cam control for moving said guides to extreme positions and auxiliary pattern control connecting with the same yarn guides and so constructed that it selectively moves the said guides to any one of three positions.

11. A knitting machine having in combination a latch ring, a support, a plurality of yarn guides arranged to pivot and for sliding radially on said support, means for moving each of said guides to three distinct positions and cam means on the guides for sliding them radially and maintaining a proper radial position in accordance with each of the three positions to which the guide may be moved.

12. In a knitting machine a support, yarn guides free to pivot on said support and also to slide radially of the machine, means for selectively moving each of the guides to any one of three distinct positions, means normally urging said guides away from the center of the machine and other means for moving said guides toward the center of the machine to different radial positions as they are moved to different ones of the said three positions.

ROBERT H. LAWSON.
AUGUSTIN GAGNÉ.